United States Patent [19]

Rennie et al.

[11] 3,712,478

[45] Jan. 23, 1973

[54] LOG YARDING SYSTEM AND METHOD

[75] Inventors: David G. Rennie, Burnaby, British Columbia; Maurice J. McIntyre, Coquitlam, New Westminster, British Columbia, both of Canada

[73] Assignee: Skagit Corporation, Sedro-Woolley, Wash.

[22] Filed: April 28, 1969

[21] Appl. No.: 819,680

Related U.S. Application Data

[60] Division of Ser. No. 698,826, Jan. 18, 1968, Pat. No. 3,531,000, which is a continuation-in-part of Ser. No. 618,022, Feb. 23, 1967, Pat. No. 3,407,942.

[52] U.S. Cl. .......................... 212/89, 212/90, 212/96
[51] Int. Cl. .................................................. B66c 21/00
[58] Field of Search ............... 212/76, 77, 80, 89–99, 212/19; 254/175.7

[56] References Cited

UNITED STATES PATENTS

| 745,253 | 11/1903 | Smith | 212/84 |
| 682,666 | 9/1901 | Brown | 212/90 |
| 878,482 | 2/1908 | Miller | 212/96 |
| 1,789,472 | 1/1931 | Meany | 212/89 |
| 3,011,653 | 12/1961 | Carsen | 212/89 |
| 3,105,597 | 10/1963 | Knott | 212/96 |
| 3,436,056 | 4/1969 | Thompson | 254/185 |

FOREIGN PATENTS OR APPLICATIONS

| 1,411,691 | 12/1965 | France | 254/175.5 |

*Primary Examiner*—Harvey C. Hornsby
*Attorney*—Jackson & Jones and Plante, Arens, Hartz, Smith and Thompson

[57] ABSTRACT

A system for yarding logs wherein a running skyline is rigged between a yarding tower and an outlying tail block. A suspension carriage rides on the running skyline and receives a two-part main line. A load line attaches to one part of the main line and extends over a load line sheave. The main line sheave and load line sheave are mechanically interconnected through a clutch and gear train so that the suspension carriage pulls slack in the load line.

4 Claims, 4 Drawing Figures

PATENTED JAN 23 1973 3,712,478
SHEET 1 OF 2
FIG_1
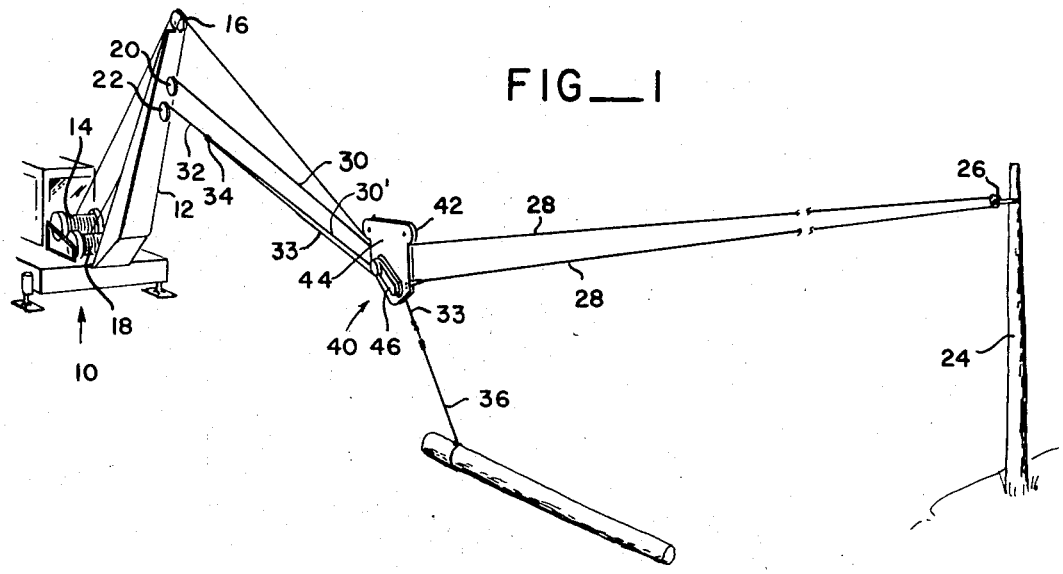
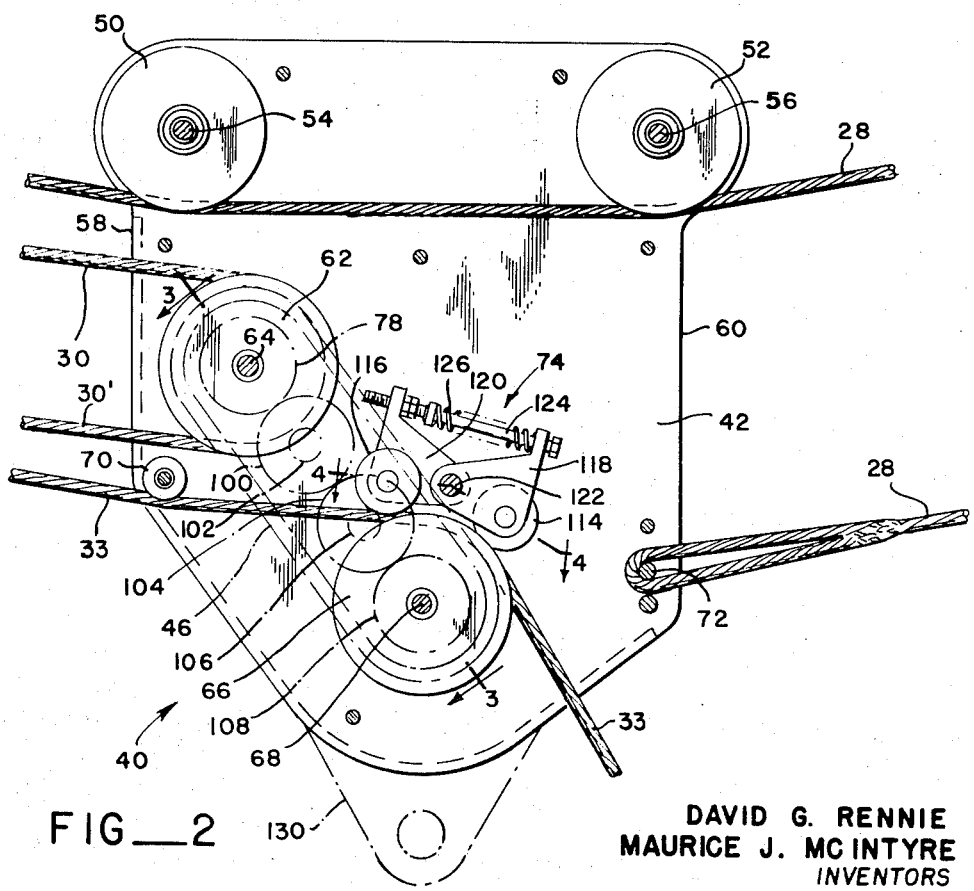
FIG_2
DAVID G. RENNIE
MAURICE J. MCINTYRE
INVENTORS
Graybeal, Cole & Barnard
ATTORNEYS

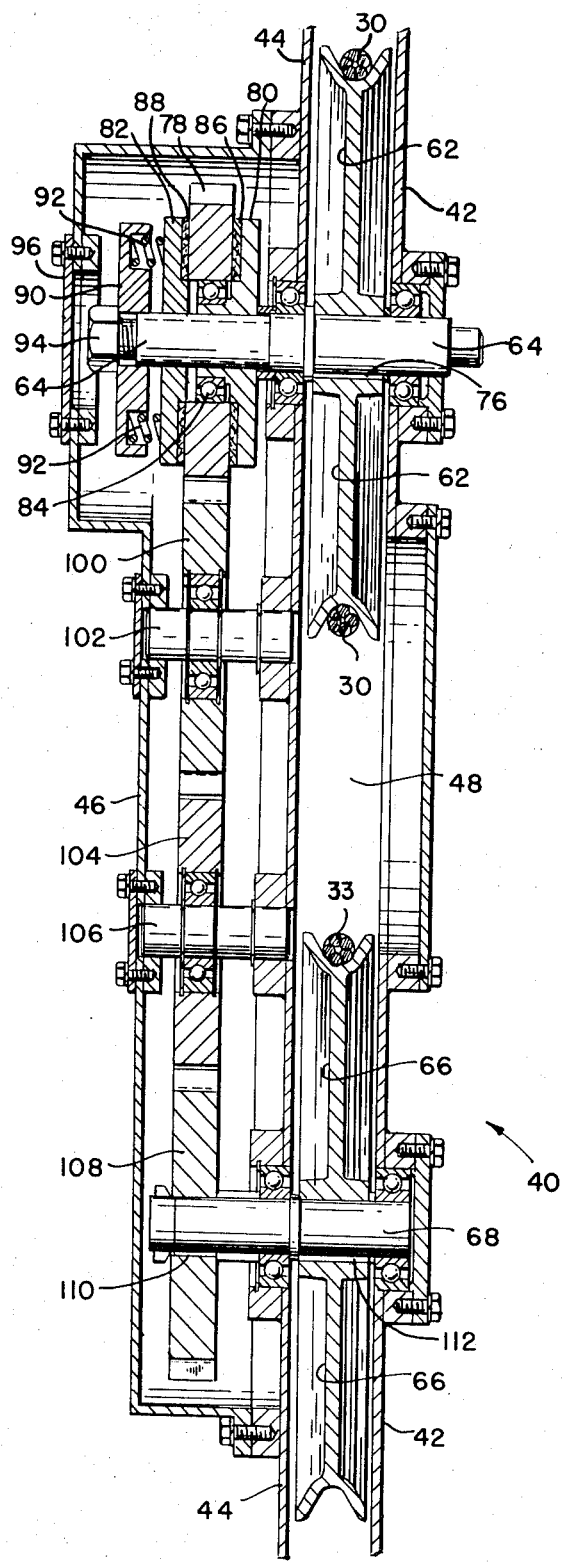

LOG YARDING SYSTEM AND METHOD

CROSS-REFERENCES TO RELATED APPLICATIONS

This application is a division of our copending application Ser. No. 698,826, entitled Scab Line Carriage System Method and Apparatus, and filed Jan. 18, 1968, now U.S. Pat. No. 3,531,000 as a continuation-in-part of our copending application Ser. No. 618,022, filed Feb. 23, 1967, entitled Log Yarding System, and issued as U.S. Pat. No. 3,407,942 on Oct. 29, 1968.

BACKGROUND OF THE INVENTION

1. Field of the Invention

The invention herein relates generally to the art of logging and more particularly to a new and novel system for yarding felled and trimmed logs to a loading area.

2. Description of the Prior Art

Tower yarding systems have heretofore comprised a number of rigging arrangements for transporting or pulling a turn of logs from the area being logged to a landing. Yarding system cable riggings differ according to the topography involved and the timer stand conditions such as whether the terrain is cleared or being logged selectively. Such cable rigging assemblies include a main or inhaul line extending through a fairlead assembly atop the yarding tower or spar to a main cable winding drum or winch which is designed to wind in the main cable so that a turn of logs is brought to the landing at the base of the tower. The yarding systems may have cables called chokers which wrap around the logs and which attach to the main or inhaul cable. They also include a haulback or outhaul line extending outwardly through side and tail blocks attached to stumps or trees and back through a lead block mounted on the tower to a haulback drum or winch. The haulback is responsible for taking the pick-up cables, such as the chokers, back out from the tower into the yarding road to pick up another turn of logs. Chokers may be connected directly to the inhaul and outhaul lines or attached to a suspension carriage. The carriage in turn would be connected to the inhaul and outhaul lines and designed to traverse a suspension line extending between the tower and the tail spar or pole.

One problem inherent in known tower yarding systems is the fact that none may be universally used. Some systems are practical for uphill yarding while others are confined to downhill yarding. Other types of yarding systems must be used where the terrain is too rugged for choker setters or where selective or clear logging is involved. Grapple yarding, for instance, is efficient in a clear-cut area having a lot of wood. It has the disadvantage, however, of yarding a narrow road and it is not practical in selectively cut stands. Known yarding systems employing carriages with two-part main cables generate slack in the lower main line when the carriage is moving out into the road. Furthermore, there is no present way of efficiently logging uphill in a selectively cut timber stand except by a so-called "radio" carriage which is highly complex and therefore costly. Another way of logging selectively is by skidder system but again crew requirements are large making the system costly. Again, with the exception of grapple yarding, a major disadvantage in known yarding systems is the high requirement for labor such as choker setters.

SUMMARY OF THE INVENTION

The invention herein embraces a novel carriage structure using a two-part main line wherein the main line sheave is interlocked with the load line sheave so that the carriage in effect has a self-contained slack line pulling capability.

It is a primary feature of this invention to provide a tower yarding system which can be used in all topographic situations, whether uphill, downhill, level and whether selectively cut or cleared. Still another feature of this invention is to provide a yarding system with a suspension carriage containing a cable-driven, self-contained slack puller. Still another feature is to provide a yarding system which can be operated with as little as a quarter of the manpower requirement for a conventional skidder system. Yet another feature is to provide a yarding system wherein the choker assemblies may be preset around logs while a turn of logs is being yarded to the landing. A further feature is to provide a yarding system whereby tongs or grapples may be used in place of chokers. A still further feature is to provide a yarding system which can yard wide roads and therefore requires less moving of the yarder tower and/or tail block.

These and other objects, features and advantages will become apparent from the following description and accompanying drawings wherein like numerals will refer to like parts throughout.

DESCRIPTION OF THE DRAWINGS

FIG. 1 is a pictorial representation showing generally the cable rigging of this invention from a guylineless tower yarder to a tail pole or tail block according to this invention;

FIG. 2 is a side elevational view of the carriage with one mounting plate removed in order to show the arrangement of sheaves, main and load sheave interlock, and cable disposition in the carriage;

FIG. 3 is an end cross-sectional elevational view taken along the lines 3—3 of FIG. 2 and illustrating in detail the gearing and clutch arrangement for the interlock between the main and load line sheaves; and FIG. 4 is a cross-sectional view taken on the line 4—4 of FIG. 3 to illustrate further the details of the tension rollers used on the load line sheave.

DESCRIPTION OF THE PREFERRED EMBODIMENTS

Referring now to the drawings, it will be seen that a mobile yarder, generally designated by the number 10, has a tower 12, haulback drum 14, haulback sheave 16, main line drums or winches 18, and upper and lower main line sheaves 20 and 22 respectively. The tail pole or spar 24 may be fixed as shown or also mobile. The tail spar 24 will have tail block 26, although those skilled in the art will realize that the tail block does not have to be attached to a pole but could be secured to a stump or other anchoring means. Extending between the yarder tower 12 and tail pole 24 is the haulback or outhaul line or cable 28, also termed a "traveling sky line", which as can be seen winds onto haulback drum 14. Outhaul or sky line 28 is received through tail block 26 and connected to or deadheaded on the suspension carriage, generally designated by the number 40. Thus, outhaul line 28 not only supports carriage 40 but serves as the haulback or outhaul line.

A two-part main line is comprised of main line part 30 and main line part 32. In the illustrated system main line part 32 actually comprises the load line 33, i.e., they are sections of a continuous line. Main line part 30 extends from upper yarder sheave 20 to carriage 40, around a main line sheave in the carriage and back to a connecting point 34 which serves as a division point between main line part 32 and load line 33. At the outer end of load line 33 is a choker or plurality of choker cables 36 for holding the logs. The reach distance to which load line 33 may be played out is determined by the location of connection point 34 on main line part 32. It will be appreciated that as main line part 30 is wound in on its drum 18 the main line part 32 will be played out thus creating a slack situation in load line 32. Load line 32 will not play out or force itself through carriage 40 and upon such movement of point 34 tends to sag or belly. Obviously, if load line 33 is connected to a turn of logs there is no concern about slack. It is when carriage 40 is traversing back out onto the road without a load that an unmanageable slack situation can develop in line 33 if the slack is not positively fed through the carriage 40.

Carriage 40, as can be seen in FIGS. 2 and 3, comprises main side plates 42 and 44. In addition, the carriage has clutch and gear train housing 46 mounted on the outside of mounting plate 44. Mounting plates 42 and 44 are spaced apart and define a pulley or sheave cavity 48. At the upper portion of the carriage structure are suspension pulleys or sheaves 50 and 52 which are spaced apart and generally horizontally disposed with respect to each other on shafts 54 and 56. Pulleys 50 and 52 ride on outhaul line 28. Carriage 40 has forward edge 58 which is nearest the yarder tower and rear edge 60 nearest the tail spar or pole 24.

Near forward edge 58 and below forward suspension pulley 50 is main line pulley 62 mounted on shaft 64 around which passes upper main line 30. At the lower portion of carriage 40 is load line sheave 66 mounted between plates 42 and 44 on shaft 68. Load sheave 66 is located so that load line 33 will pass under and be spaced from the lower flight 30' of main line part 30. To this end, a guide roller 70 assists in maintaining spacing between lines 30' and 33. Outhaul cable or line 28 can be seen to be anchored near the rear edge of the carriage as at 72. A spring tensioned pressure roller assembly, generally designated by the number 74, and to be more fully described hereinafter, is located immediately above load sheave 66.

Referring now to FIG. 3, it will be seen that a clutch including gear train arrangement for interlocking main sheave 62 and load sheave 66 is contained within a housing 46. The housing 46 is generally of the location and configuration shown in dash-dot lines in FIG. 2 on the outside of main housing plate 44. Shaft 64 of main line sheave 62 extends through mounting plate 44 and into the gear train area defined by housing 46. Sheave 62 is keyed as at 76 to shaft 64 for positive driven rotation of said shaft. Appropriate bearing structure, not numbered, is provided as shown for the shaft 64.

Within housing 46 is gear 78 which is freely rotatable with respect to shaft 64. On each side of gear 78 are clutch plates 80 and 82 which are splined to shaft 64. It will be noted that gear 78 runs on bearings 84 which are shown to be mounted on the hub portion of clutch plate 80. Between each of the clutch plates 80 and 82 and the side surfaces of gear 78 are clutch friction facings 86 and 88. At the outer end of shaft 64 is splined a pressure plate 90 having compression springs 92 between said pressure plate and friction clutch plate 82. A pressure adjustment nut 94 engages pressure plate 90 so that the desired amount of friction may be established between plates 80, 82 and gear 78. The above elements define a simple slip clutch arrangement between main sheave 62 and gear 78. An access cover 96 can be removed from housing 46 to allow for rapid and convenient adjustment of the friction clutch pressure.

Gear 78 meshes with an idler gear 100 mounted for free rotation on shaft 102. In like manner, gear 100 meshes with an idler gear 104 appropriately mounted for free rotation on shaft 106. Finally, idler gear 104 meshes with driven gear 108 which is keyed as at 110 to shaft 68 on which is mounted load sheave 66 which is also keyed to shaft 68 as at 112.

With idler gears 100 and 104 disposed between drive and driven gears 78 and 108, a positive drive is established between main line sheave 62 and load sheave 66. The friction clutch assembly connected to drive gear 78 permits slippage in those instances where the load would create too much slippage on the cables thus resulting in excessive wear on both cables and sheaves. For instance, when load line 33 has a turn of logs connected thereto and is moving them toward the yarder, load line sheave 66 will be turning counterclockwise as viewed in FIG. 2. Main line sheave 62 will be turning clockwise. The gear arrangement is such that load line sheave 66 turns approximately 10 percent faster than main line sheave 62 though the ratio may vary if desired. With a turn of logs on load line 33, a direct unclutched connection between the two sheaves would cause excessive cable wear since it is designed primarily to positively turn load line sheave 66 for the purpose of taking or feeding cable slack when load line 33 is being played out through the carriage. Rotating the load line sheave 66 at a slightly faster rate than main line sheave 62 enables sheave 66 to turn or rotate at sufficient speed to keep load line 33 substantially taut between said sheave 66 and connection point 34. In effect the direct connection or positive drive between the two sheaves allows main line part 30 to pull slack in load line 33. The direct interlock with slip clutch minimizes cable and sheave wear.

A pair of spring-biased pressure rollers 114 and 116 are mounted on pivotal brackets 118 and 120. The brackets pivot on shaft 122 mounted between main carriage plates 42 and 44. The brackets are biased apart by adjusting bolt 124 on which is mounted compression spring 126. Accordingly, the desired pressure by adjustment of the spring pressure between bracket plates 118 and 120 determines the amount of pressure applied by rollers 114 and 116 to load line 33 as it passes over load sheave 66.

It will be appreciated by those skilled in the art that the slack pulling interlock or clutch and gear train assembly could be replaced by a chain drive mechanism with an appropriate safety clutch feature. Additionally, a multiple coacting sheave gripper assembly could also be substituted where one of the coacting gripper sheaves would be driven from the main line sheave or from tramming sheaves. In addition, it will be understood that if it were desired to use grapples with the carriage, our aforementioned U.S. Pat. No. 3,407,942, that the interlock could be disconnected and the pressure roller assembly 74 detached. In this case, the grapples would be attached to the grapple connector portion 130 at the bottom of the carriage. In such an operation, the carriage with the grapples thereon, would be lowered and raised by slacking and tensioning outhaul line 28.

In the operation contemplated for this type of carriage, chokers may be wound on the log or logs comprising the turn. The carriage will be moved outwardly from the yarder tower toward the tail block. In order to play load line 33 out to make it accessible to choker cable connections, upper main line 30 will be rotating main line sheave 62 in a counterclockwise direction as viewed in FIG. 2. The positive rotation of sheave 62 by main line part 30 in a counterclockwise direction drives the gear train which in turn rotates load line sheave 66 in a clockwise direction. The positive drive on the load sheave pulls slack load line 33 and plays it out until connector point 34 has arrived at a stop position at or near the forward edge 58 of the carriage. The choker cable or cables will be connected to load line 33 and the direction of sheave rotation will be reversed as the turn is dragged into the road and either dragged or lifted close to the carriage 40. Chokers may be attached to the load line by a number of different types of detachable connections. In any event protective means such as "doughnut" plates will be attached to the carriage through which the cables will be threaded in order to prevent cable connections and hooks from entering the carriage. Either when the turn is being dragged to the carriage or when the carriage is in fact moving back toward the yarder, the slip clutch in the carriage eliminates or at least minimizes wear on cables and sheaves and the turn is then brought into the landing and the operation repeated. It will be understood that this unique system enables yarding of logs to a considerable distance on each side of the cable and that thus a very wide road may be logged. It will also be recognized that the system can be employed effectively in timber stands where logs have been selectively felled.

It is believed that the invention will be clearly understood from the foregoing detailed description. Changes in the details of construction and method of logging by this system may be resorted to without departing from the spirit of the invention and accordingly no limitations are implied.

What is claimed is:

1. In a log yarding system of a type comprising a yarder mechanism including sky line winch means and main line winch means, a tail block spaced from said yarder mechanism, and a traveling sky line connected to said sky line winch means and extending therefrom outwardly to said tail block, then over and around said tail block, and then back towards said yarder mechanism, yarding equipment comprising:
  a carriage including means supporting it on and for movement along said sky line, between said yarder mechanism and said tail block the free end of said sky line being connected to said carriage;
  a main line sheave supported on said carriage below said supporting means;
  a two part main line extending from said main line winch means to said main line sheave, then around said main line sheave, then back to said main line winch means, with both ends of said main line being connected to said main line winch means;
  a load line sheave supported on said carriage;
  a load line connected to one part of said main line at a location spaced towards the yarder mechanism from the main line sheave, and extending from said location to said load line sheave, then over said load line sheave, and then vertically downwardly for connection to a turn of logs; and
  means interconnecting said main line and load line sheaves, so that rotational movement of the main line sheave during main line movement in the direction involving movement of the connection point of the load line to the main line towards the carriage is transmitted to the load line sheave, causing said load line sheave to positively play out said load line, said interconnecting means further including slip clutch means for permitting slippage in said drive means in an instance wherein a log load would tend to cause excessive slippage to occur between one of the sheaves and its line if the clutch means were omitted.

2. In a log yarding system of a type comprising a yarder mechanism including sky line winch means and main line winch means, a tail block spaced from said yarder mechanism, and a traveling sky line connected to said sky line winch means and extending therefrom outwardly to said tail block, then over and around said tail block, and then back towards said yarder mechanism, yarding equipment comprising:
  a carriage including means supporting it on and for movement along said sky line, between said yarder mechanism and said tail block the free end of said sky line being connected to said carriage;
  a main line sheave supported on said carriage below said supporting means;
  a two part main line extending from said main line winch means to said main line sheave, then around said main line sheave, then back to said main line winch means, with both ends of said main line being connected to said main line winch means;
  a load line sheave supported on said carriage;
  a load line connected to one part of said main line at a location spaced towards the yarder mechanism from the main line sheave, and extending from said location to said load line sheave, then over said load line sheave, and then vertically downwardly for connection to a turn of logs; and
  means interconnecting said main line and load line sheaves, so that rotational movement of the main line sheave during main line movement in the direction involving movement of the connection point of the load line to the main line towards the carriage is transmitted to the load line sheave, causing said load line sheave to positively play out said load line said interconnecting means further including means for rotating the load line sheave at a slightly faster rate than the main line sheave, so that sufficient tension is maintained in the load line and slip clutch means for permitting slippage in interconnecting drive means in an instance wherein a log load would tend to cause excessive slippage to occur between one of the sheaves and its line if the clutch means were omitted.

3. In a log yarding system of a type comprising a yarder mechanism including sky line winch means and main line which means, a tail block spaced from said yarder mechanism, and a traveling sky line connected to said sky line winch means and extending therefrom outwardly to said tail block, then over and around said tail block, and then back towards said yarder mechanism, yarding equipment comprising:

a carriage including means supporting it on and for movement along said sky line, between said yarder mechanism and said tail block the free end of the sky line being connected to said carriage;

a main line sheave supported on said carriage below said supporting means;

a two part main line extending from said main line winch means to said main line sheave, then around said main line sheave, then back to said main line winch means, with both ends of said main line being connected to said main line which means;

a load line sheave supported on said carriage;

a load line connected to one part of said main line at a location spaced towards the yarder mechanism from the main line sheave, and extending from said location to said load line sheave, then over said load line sheave, and then vertically downwardly for connection to a turn of logs; and means interconnecting said main line and load line sheaves, so that rotational movement of the main line sheave during main line movement in the direction involving movement of the connection point of the load line to the main line towards the carriage is transmitted to the load line sheave, causing said load line sheave to positively play out said load line, said main line and load line sheaves are secured to shafts which project laterally of the carriage and said interconnecting means further comprises a gear on each such shaft and two intermediate gears meshing with each other and each meshing with one of the shaft gears, so that the main line and load line sheaves rotate in opposite directions.

4. In a log yarding system of a type comprising a yarder mechanism including sky line winch means and main line winch means, a tail block spaced from said yarder mechanism, and a traveling sky line connected to said sky line winch means and extending therefrom outwardly to said tail block, then over and around said tail block, and then back towards said yarder mechanism, yarding equipment comprising:

a carriage including means supporting it on and for movement along said sky line, between said yarder mechanism and said tail block the free end of said sky line being connected to said carriage;

a main line sheave supported on said carriage below said supporting means;

a two part main line extending from said main line winch means to said main line sheave, then around said main line sheave, then back to said main line winch means, with both ends of said main line being connected to said main line winch means;

a load line sheave supported on said carriage;

a load line connected to the lower run of the two part main line at a location spaced towards the yarder mechanism from the main line sheave, and extending from said location to said load line sheave, then over said load line sheave, and then vertically downwardly for connection to a turn of logs; and means interconnecting said main line and load line sheaves so that rotational movement of the main line sheave during main line movement in the direction involving movement of the connection point of the load line to the main line towards the carriage is transmitted to the load line sheave, causing said load line sheave to positively play out said load line, said interconnecting means including means for rotating the main line and load line sheaves in opposite directions.

* * * * *